US010658100B2

(12) United States Patent
Yuasa (10) Patent No.: US 10,658,100 B2
(45) Date of Patent: May 19, 2020

(54) COIL UNIT HAVING COOLING APPARATUS

(71) Applicant: Toyota Jidosha Kabushiki Kaisha, Toyota-shi, Aichi-ken (JP)

(72) Inventor: Hiroaki Yuasa, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 58 days.

(21) Appl. No.: 16/013,366

(22) Filed: Jun. 20, 2018

(65) Prior Publication Data

US 2018/0374624 A1 Dec. 27, 2018

(30) Foreign Application Priority Data

Jun. 21, 2017 (JP) ................................. 2017-120974

(51) Int. Cl.
| | | |
|---|---|---|
| *H01M 10/46* | (2006.01) | |
| *H01F 27/08* | (2006.01) | |
| *B60L 53/22* | (2019.01) | |
| *H01F 38/14* | (2006.01) | |
| *H01F 27/36* | (2006.01) | |
| *H02J 50/12* | (2016.01) | |
| *H02J 7/02* | (2016.01) | |
| *B60L 53/20* | (2019.01) | |
| *H01F 27/10* | (2006.01) | |
| *B60L 53/12* | (2019.01) | |
| *B60L 3/00* | (2019.01) | |
| *H01F 27/24* | (2006.01) | |
| *H01F 27/28* | (2006.01) | |
| *H01F 27/40* | (2006.01) | |

(52) U.S. Cl.
CPC ............ *H01F 27/08* (2013.01); *B60L 3/0023* (2013.01); *B60L 53/12* (2019.02); *B60L 53/20* (2019.02); *B60L 53/22* (2019.02); *H01F 27/10* (2013.01); *H01F 27/24* (2013.01); *H01F 27/28* (2013.01); *H01F 27/365* (2013.01); *H01F 38/14* (2013.01); *H02J 7/025* (2013.01); *H02J 50/12* (2016.02); *B60L 2210/30* (2013.01); *B60L 2240/36* (2013.01); *H01F 2027/408* (2013.01)

(58) Field of Classification Search
CPC ........ H02J 7/0027; H02J 7/355; H02J 7/0042; H02J 7/025; H02J 7/0091
USPC ................ 320/104, 107, 108, 109, 140, 150
See application file for complete search history.

(56) References Cited

U.S. PATENT DOCUMENTS

| | | | |
|---|---|---|---|
| 7,741,734 B2 | 6/2010 | Joannopoulos et al. | |
| 2007/0222542 A1 | 9/2007 | Joannopoulos et al. | |
| 2008/0278264 A1 | 11/2008 | Karalis et al. | |
| 2009/0195332 A1 | 8/2009 | Joannopoulos et al. | |
| 2009/0195333 A1 | 8/2009 | Joannopoulos et al. | |

(Continued)

FOREIGN PATENT DOCUMENTS

| | | | |
|---|---|---|---|
| AU | 2006269374 B2 | 10/2009 | |
| AU | 2007349874 A2 | 1/2010 | |

(Continued)

*Primary Examiner* — Edward Tso
(74) *Attorney, Agent, or Firm* — Dinsmore & Shohl LLP (57) ABSTRACT

A coil unit includes a ferrite plate including a coil carrying surface and a rear surface opposite to the coil carrying surface, a coil arranged on a side of the coil carrying surface of the ferrite plate, a device arranged on a side of the rear surface of the ferrite plate, and a cooling apparatus which feeds a coolant between the ferrite plate and the device.

2 Claims, 8 Drawing Sheets

(56) References Cited

U.S. PATENT DOCUMENTS

| | | |
|---|---|---|
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2013/0127409 A1 | 5/2013 | Ichikawa |
| 2013/0154553 A1* | 6/2013 | Steele ................ B60M 7/003 320/108 |
| 2013/0193749 A1 | 8/2013 | Nakamura et al. |
| 2015/0008877 A1 | 1/2015 | Ichikawa et al. |
| 2015/0364924 A1 | 12/2015 | Yuasa |
| 2018/0072182 A1* | 3/2018 | Araki ................ H02J 7/00 |
| 2018/0254136 A1* | 9/2018 | Ueda ................ H02J 50/10 |

FOREIGN PATENT DOCUMENTS

| | | |
|---|---|---|
| AU | 2010200044 A1 | 1/2010 |
| AU | 2006269374 C1 | 3/2010 |
| CA | 2615123 A1 | 1/2007 |
| CA | 2682284 A1 | 10/2008 |
| CN | 101258658 A | 9/2008 |
| CN | 101682216 A | 3/2010 |
| CN | 101860089 A | 10/2010 |
| EP | 1902505 A2 | 3/2008 |
| EP | 2130287 A1 | 12/2009 |
| EP | 3179493 A2 | 6/2017 |
| IN | 735/DELNP/2008 | 5/2008 |
| IN | 6195/DELNP/2009 | 7/2010 |
| JP | 2009-501510 A | 1/2009 |
| JP | 2013-110822 A | 6/2013 |
| JP | 2013-126327 A | 6/2013 |
| JP | 2013-146148 A | 7/2013 |
| JP | 2013146154 A | 7/2013 |
| JP | 2013154815 A | 8/2013 |
| JP | 2013-198356 A | 9/2013 |
| KR | 20080031398 A | 4/2008 |
| KR | 20100015954 A | 2/2010 |
| WO | 2007008646 A2 | 1/2007 |
| WO | 2008118178 A1 | 10/2008 |
| WO | 2016030413 A1 | 3/2016 |
| WO | 2017165024 A1 | 9/2017 |

* cited by examiner

COIL UNIT HAVING COOLING APPARATUS

CROSS-REFERENCE TO RELATED APPLICATIONS

This nonprovisional application claims priority to Japanese Patent Application No. 2017-120974 filed with the Japan Patent Office on Jun. 21, 2017, the entire contents of which are hereby incorporated by reference.

BACKGROUND

Field

The present disclosure relates to a coil unit.

Description of the Background Art

A coil unit of an electric power reception device or an electric power transmission device which is cooled by a cooling apparatus has conventionally been known (Japanese Patent Laying-Open No. 2013-154815, Japanese Patent Laying-Open No. 2013-146154, Japanese Patent Laying-Open No. 2013-146148, Japanese Patent Laying-Open No. 2013-110822, and Japanese Patent Laying-Open No. 2013-126327).

A coil unit on an electric power reception side described in Japanese Patent Laying-Open No. 2013-198356 includes a coil and a cooling apparatus. The coil unit on the electric power reception side is connected to a rectifier mounted on a vehicle and the rectifier is connected to a power storage device. A cooling fan which sends cooling air to the coil is adopted as the cooling apparatus.

A coil unit on an electric power transmission side includes a coil and a cooling apparatus. The coil unit on the electric power transmission side is connected to a power supply portion and the power supply portion is connected to a power supply.

SUMMARY

In mounting the coil unit on the electric power reception side described in Japanese Patent Laying-Open No. 2013-198356 on a vehicle, the rectifier is connected to the power storage device in the vehicle and the coil unit on the electric power reception side is connected to the rectifier.

According to the configuration, however, a space for mounting the rectifier should be secured in the vehicle. In addition, for example, when the coil unit on the electric power reception side is provided later, a device such as a rectifier should be provided in the vehicle later.

In order to avoid various detrimental effects as above, a coil unit on an electric power reception side in which such a device as a rectifier has been incorporated is studied.

Regarding a coil unit in which various devices have also been incorporated as well, increase in volume of the coil unit should be suppressed, and cooling in the coil unit should be ensured.

Though description has been given in connection with the coil unit on the electric power reception side, a similar problem arises also in a coil unit on the electric power transmission side.

The present disclosure was made in view of the problems as above, and an object thereof is to provide a coil unit with devices being incorporated therein which is able to achieve satisfactory cooling of the inside thereof with increase in volume thereof being suppressed.

A coil unit according to the present disclosure includes a ferrite plate including a coil carrying surface and a rear surface opposite to the coil carrying surface, a coil arranged on a side of the coil carrying surface of the ferrite plate, a device arranged on a side of the rear surface of the ferrite plate, and a cooling apparatus which feeds a coolant between the ferrite plate and the device.

According to the configuration, the coolant from the cooling apparatus passes between the device and the ferrite plate and hence it can cool both of the ferrite plate and the device. Since the coil is arranged on the coil carrying surface of the ferrite plate, the coil can also be cooled through the ferrite plate.

Since the coil, the ferrite plate, and the device can collectively be cooled, a volume of the coil unit can be suppressed as compared with an example in which each member is individually cooled.

The foregoing and other objects, features, aspects and advantages of the present disclosure will become more apparent from the following detailed description of the present disclosure when taken in conjunction with the accompanying drawings.

DESCRIPTION OF THE EMBODIMENTS

A contactless charging system 1 according to the present embodiment will be described with reference to FIGS. 1 to 9. The same or substantially the same features among features shown in FIGS. 1 to 9 have the same reference characters allotted and redundant description may not be provided.

Figure 1:
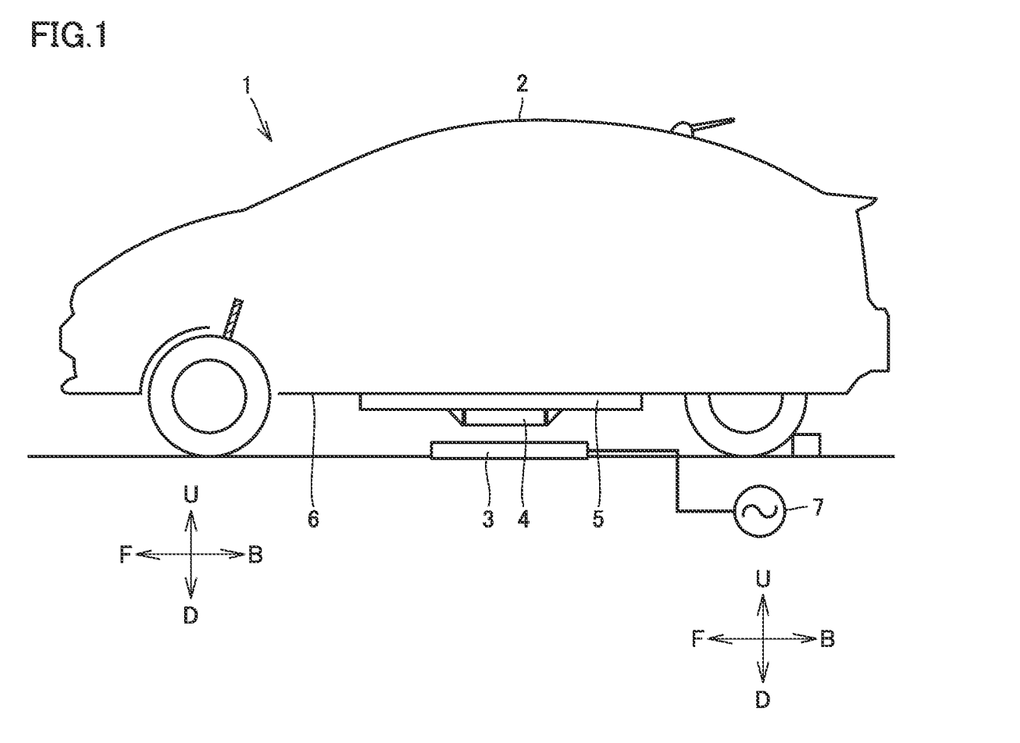
FIG. 1 is a diagram schematically showing a contactless charging system 1.
Figure 2:
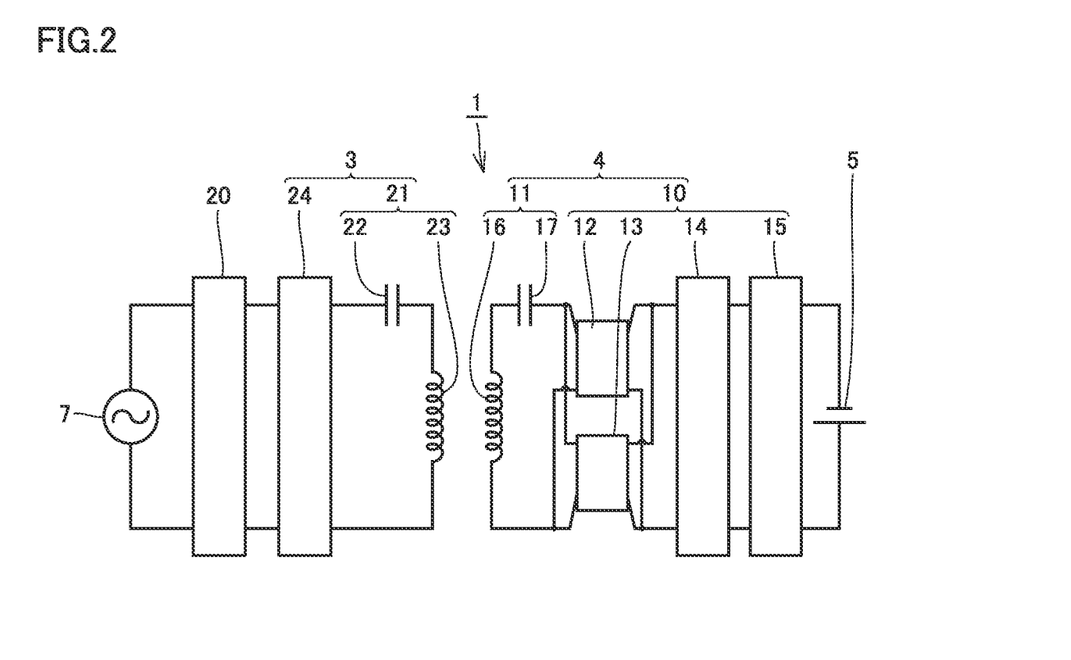
FIG. 2 is a block diagram schematically showing contactless charging system 1.

FIG. 1 is a diagram schematically showing a contactless charging system 1 and FIG. 2 is a block diagram schematically showing contactless charging system 1.

Contactless charging system 1 includes a vehicle 2, a coil unit 3, a conversion device 20, and a power supply 7.

Vehicle 2 includes a power storage device 5 and a coil unit 4. Power storage device 5 is arranged on a lower surface of a floor panel 6 of vehicle 2. Floor panel 6 is a metal member in a form of a plate which defines a bottom surface of vehicle 2.

Coil unit 4 includes a device 10 and a resonator 11. Resonator 11 includes an electric power reception coil 16 and a capacitor 17. Capacitor 17 is connected in series to electric power reception coil 16. Electric power reception coil 16 and capacitor 17 form an LC resonator. The LC resonator has a Q value not smaller than 100.

Device 10 is electrically connected to resonator 11 and power storage device 5. Device 10 includes an electric power conversion device 12, an electric power conversion device 13, a filter 14, and a charge relay 15.

Electric power conversion device 12 and electric power conversion device 13 are connected to electric power reception coil 16 of resonator 11 and to filter 14, and electric power conversion device 12 and electric power conversion device 13 are connected to each other in parallel. Electric power conversion device 12 and electric power conversion device 13 are connected electrically in parallel to each other between electric power reception coil 16 and power storage device 5 with filter 14 and charge relay 15 being interposed.

Filter 14 is connected to electric power conversion devices 12 and 13. Charge relay 15 is connected to filter 14. Charge relay 15 is connected between filter 14 and power storage device 5. Electric power conversion device 12 and electric power conversion device 13 are specifically rectifiers.

Filter 14 includes a plurality of coils and capacitors. Charge relay 15 is a relay which allows electrical connection and disconnection between filter 14 and power storage device 5. Charge relay 15 is arranged in power-storage device 5.

Power storage device 5 is a secondary battery or a capacitor. Power storage device 5 is provided on the lower surface of floor panel 6.

Power supply 7 is connected to conversion device 20. Conversion device 20 is connected to coil unit 3. Conversion device 20 regulates a frequency and a voltage of alternating-current (AC) power supplied from power supply 7 and supplies resultant AC power to coil unit 3. Conversion device 20 includes, for example, an inverter and a converter.

Coil unit 3 includes a filter 24 and a resonator 21. Filter 24 removes noise from AC power supplied from conversion device 20 and supplies resultant AC power to resonator 21. Filter 24 includes a plurality of coils and a plurality of capacitors.

Resonator 21 includes a capacitor 22 and an electric power transmission coil 23. Capacitor 22 is connected in series to electric power transmission coil 23. Electric power transmission coil 23 and capacitor 22 form an LC resonator. The resonator has a Q value not smaller than 100.

In contactless charging system 1, in contactless transmission of electric power from coil unit 3 to coil unit 4, initially, conversion device 20 regulates a frequency and a voltage of AC power supplied from power supply 7 and supplies resultant AC power to filter 24. Filter 24 removes noise from the supplied AC power and supplies resultant electric power to resonator 21. As AC power flows to electric power transmission coil 23, electromagnetic field is formed around electric power transmission coil 23.

Electric power reception coil 16 receives electric power from electromagnetic field formed around electric power transmission coil 23. AC power received by electric power reception coil 16 is converted to direct-current (DC) power by electric power conversion device 12 and electric power conversion device 13. Electric power conversion devices 12 and 13 supply DC power to filter 14. Filter 14 removes noise from DC power supplied from electric power conversion devices 12 and 13 and supplies resultant DC power to charge relay 15. In electric power reception by coil unit 4, charge relay 15 allows connection between filter 14 and power storage device 5 so that DC power is supplied to power storage device 5.

Figure 3:
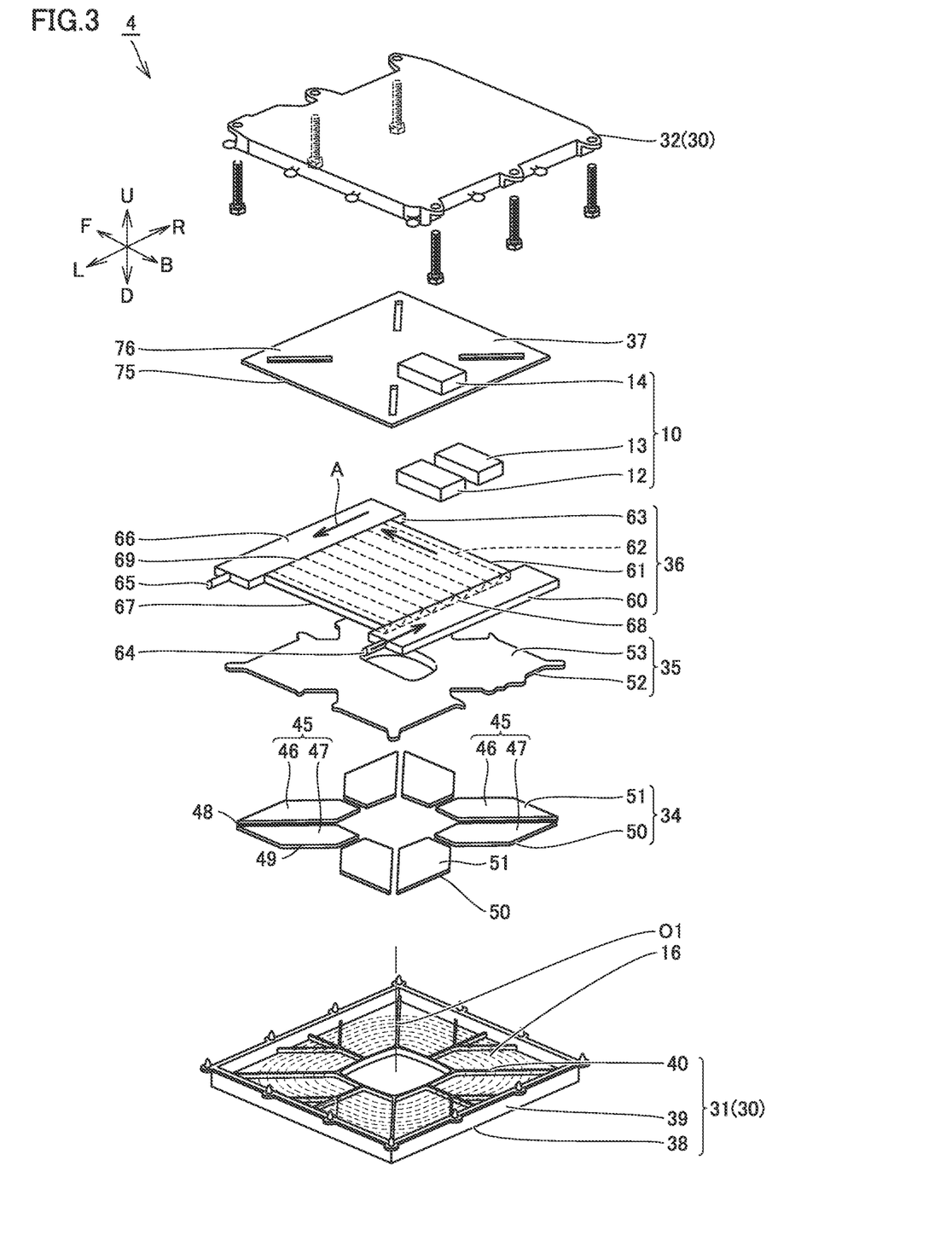
FIG. 3 is an exploded perspective view showing a coil unit 4.
Figure 4:
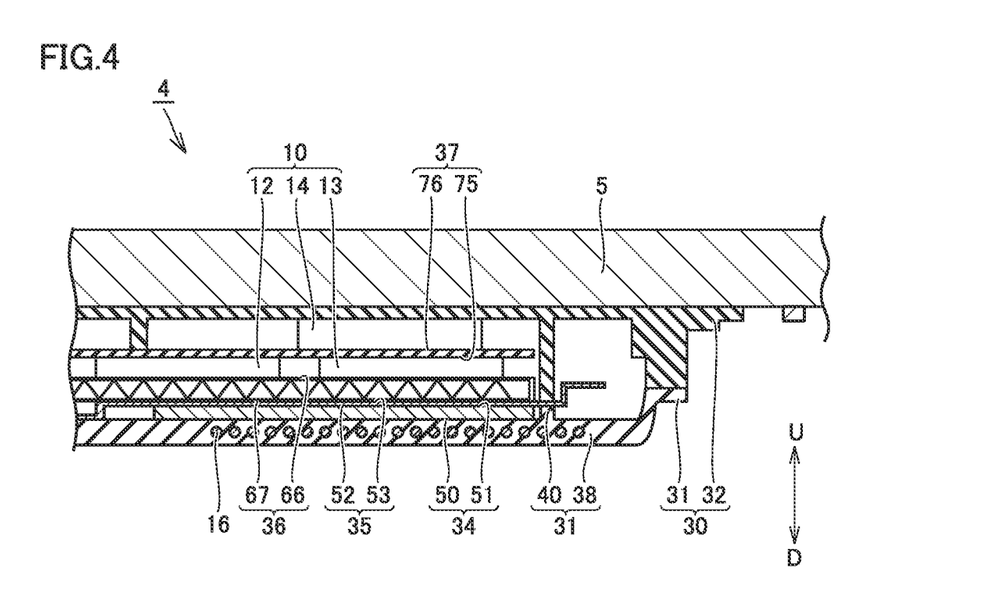
FIG. 4 is a cross-sectional view showing coil unit 4.

A configuration of coil unit 4 will now be described in detail with reference to FIGS. 3 and 4. FIG. 3 is an exploded perspective view showing coil unit 4 and FIG. 4 is a cross-sectional view showing coil unit 4. Coil unit 4 includes: a case 30, electric power reception coil 16, a ferrite plate 34, a metal plate 35, a cooling apparatus 36, device 30, and a substrate 37.

Electric power reception coil 16, ferrite plate 34, metal plate 35, cooling apparatus 36, device 10, and substrate 37 are accommodated in case 30.

Case 30 includes a lower cover 31 and an upper cover 32. Lower cover 31 is arranged on a lower surface side of coil unit 4. Upper cover 32 is arranged on an upper surface side of coil unit 4. Lower cover 31 and upper cover 32 are formed of a resin or the like.

Lower cover 31 is formed of a resin or the like. Lower cover 31 includes a lower wall 38, a sidewall 39, and a support wall 40. Sidewall 39 is formed to be erected upward from an outer peripheral edge portion of lower wall 38. An edge portion formed to extend off in a lateral direction is formed at an upper end of lower wall 38. Support wall 40 is formed on an upper surface of lower wall 38. Support wall 40 is formed to support peripheral surfaces of divided-ferrite plates 46 and 47 which will be described later.

Electric power reception coil 16 is embedded and molded in lower wall 38. Electric power reception coil 16 is formed by winding a coil wire around an axis of winding O1 which extends in a vertical direction. A hollow portion is provided in a central portion of electric power reception coil 16. Though a helical flat coil is adopted in the example shown in FIG. 3, coils in various shapes can be adopted for electric power reception coil 16.

Ferrite plate 34 is arranged on the upper surface of lower wall 38 of lower cover 31. Ferrite plate 34 is in a form of a plate. Ferrite plate 34 includes a coil carrying surface 50 and a rear surface 51. In the example shown in FIG. 3, a lower surface is defined as coil carrying surface 50 and an upper surface is defined as rear surface 51. Electric power reception coil 16 is arranged on a side of coil carrying surface 50, and metal plate 35, cooling apparatus 36, and device 10 are arranged on a side of rear surface 51.

Ferrite plate 34 includes a plurality of corner portions 48 and a discontinuous portion 49 is provided between corner portions 48. Ferrite plate 34 includes a plurality of ferrite pieces 45. Ferrite pieces 45 are arranged in a form of a frame. Corner portion 48 is formed by each ferrite piece 45. Each discontinuous portion 49 is defined by two adjacent ferrite pieces 45.

Ferrite piece 45 includes divided ferrite plate 46 and divided ferrite plate 47. Divided ferrite plates 46 and 47 are formed to extend from the center toward corner portion 48 of ferrite plate 34.

Each of divided ferrite plates 46 and 47 is arranged on the upper surface of lower wall 38 of lower cover 31 so that peripheral surfaces of divided ferrite plates 46 and 47 are supported by support wall 40.

Metal plate 35 is arranged on the side of rear surface 51 of ferrite plate 34. Metal plate 35 is formed, for example, of a metal such as aluminum or an aluminum alloy. Metal plate 35 is in a form of a plate and includes a lower surface 52 and an upper surface 53.

Cooling apparatus 36 is arranged on upper surface 53 of metal plate 35. Cooling apparatus 36 is substantially in a form of a plate. Cooling apparatus 36 includes an upper surface 66 and a lower surface 67.

Cooling apparatus 36 includes a coolant storage portion 60, a cooling portion 61, a guide plate 62, and a coolant storage portion 63, and cooling apparatus 36 is arranged on upper surface 53 of metal plate 35.

Cooling portion 61 is in a form of a hollow plate. A supply port 68 is provided in one side surface of cooling portion 61 and a discharge port 69 is provided in the other side surface of cooling portion 61.

Coolant storage portion 60 is connected to supply port 68 of cooling portion 61. Coolant storage portion 63 is connected to discharge port 69 in the other side surface located opposite to coolant storage portion 60.

Guide plate 62 is arranged in cooling portion 61. Guide plate 62 is formed to extend from supply port 68 toward discharge port 69.

A supply pipe 64 is connected to coolant storage portion 60 and a coolant A is supplied from supply pipe 64 to coolant storage portion 60. Coolant A supplied to coolant storage portion 60 is supplied into cooling portion 61. Coolant A supplied into cooling portion 61 is guided by guide plate 62 from a side of supply port 68 to ward discharge port 69. Coolant A is supplied from discharge part 69 into coolant storage portion 63 and discharged through a discharge pipe 65. Discharge pipe 65 is connected to a not-shown radiator and coolant A is cooled by the radiator and again supplied to supply pipe 64. Coolant A is forced to circulate by a pump.

Substrate 37 is arranged on a side of upper surface 66 of cooling apparatus 36. Substrate 37 is in a form of a plate and includes a lower surface 75 and an upper surface 76.

Electric power conversion device 12 and electric power conversion device 13 are arranged on lower surface 75 of substrate 37. Filter 14 is arranged on upper surface 76 of substrate 37.

Electric power conversion device 12 and electric power conversion device 13 lie between upper surface 66 of cooling apparatus 36 and lower surface 75 of substrate 37.

Cooling apparatus 36 is arranged between electric power conversion devices 12 and 13 representing device 10 and electric power reception coil 16. Specifically, cooling apparatus 36 is arranged between electric power conversion devices 12 and 13 representing device 10 and ferrite plate 34, and cooling apparatus 36 feeds coolant A to pass between ferrite plate 34 and electric power conversion devices 12 and 13.

Though electric power conversion device 12 and electric power conversion device 13 are shown as device 10 arranged on the side of upper surface 66 of cooling apparatus 36, another device other than electric power conversion devices 12 and 13 may be arranged. Specifically, a coil of filter 14 may be arranged. During electric power reception, the coil of filter 14 tends to be higher in temperature than the capacitor of filter 14.

Figure 5:
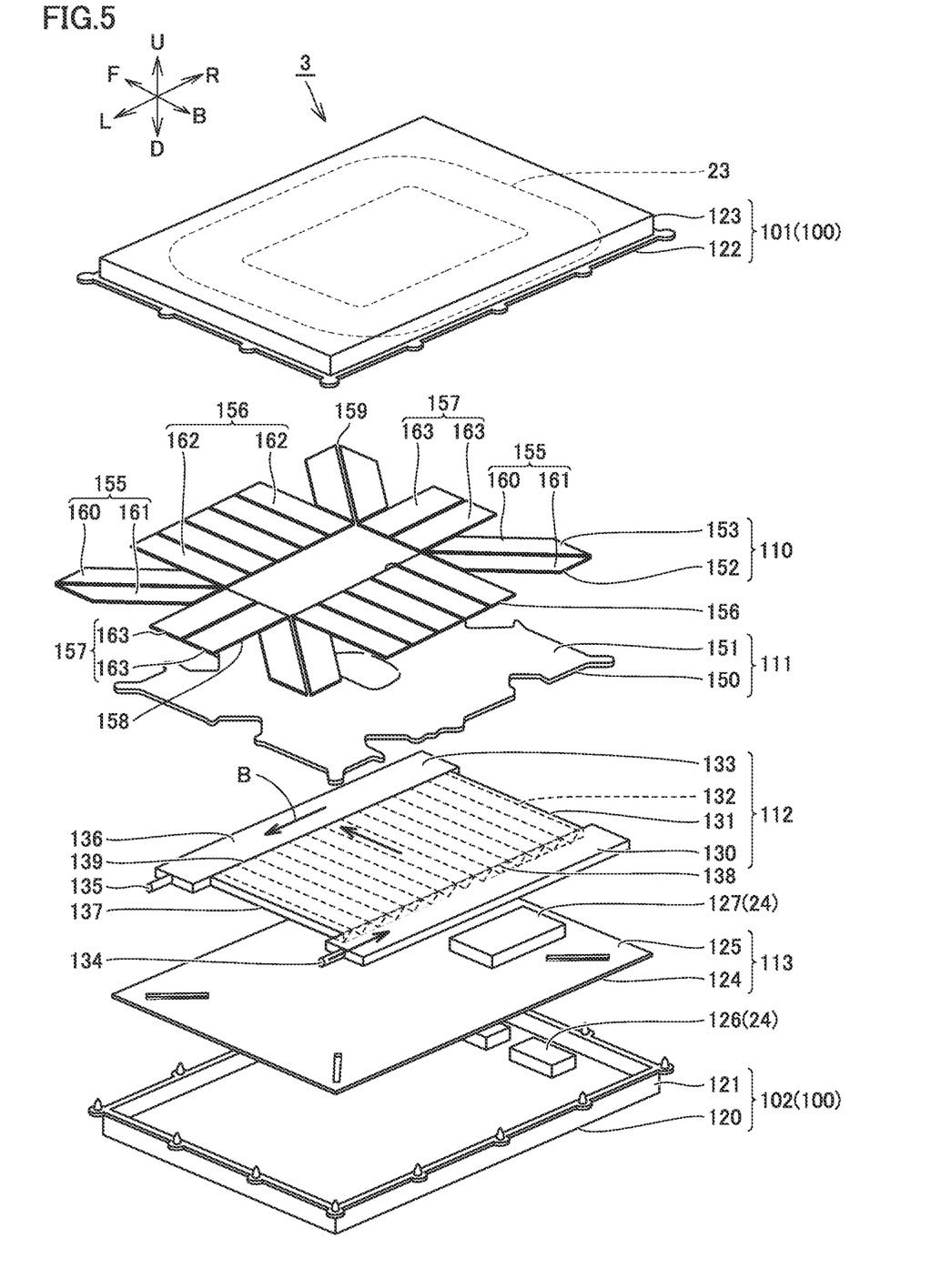
FIG. 5 is an exploded perspective view showing a coil unit 3.
Figure 6:
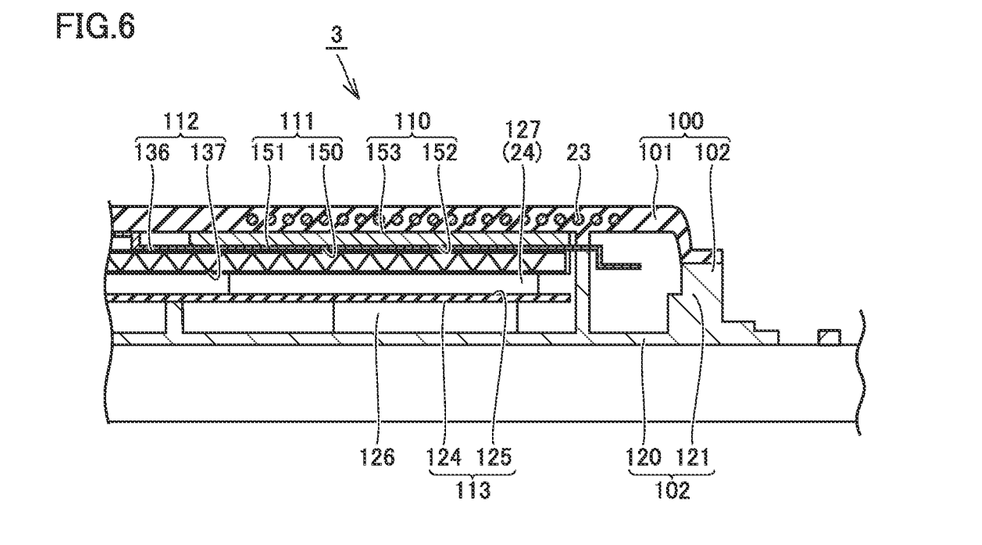
FIG. 6 is a cross-sectional view showing coil unit 3.

A configuration of coil unit 3 on an electric power transmission side will now be described with reference to FIGS. 5 and 6. FIG. 5 is an exploded perspective view showing coil unit 3 and FIG. 6 is a cross-sectional view showing coil unit 3.

Coil unit 3 includes a case 100, a ferrite plate 110, a metal plate 111, a cooling apparatus 112, a substrate 113, and a filter 24.

Case 100 includes an upper cover 101 and a lower cover 102. Upper cover 101 is formed of a resin, or the like. Lower cover 102 is formed of a metal such as aluminum or an aluminum alloy. Lower cover 102 includes a lower wall 120 and a sidewall 121. Sidewall 121 is formed to be erected upward from an outer peripheral edge portion of the lower wall 120. Upper cover 101 includes an upper wall 123 and a sidewall 122. Sidewall 122 is formed to be erected downward from an outer peripheral edge portion of the upper wall 123.

Electric power transmission coil 23 is embedded and molded in the upper wall 123 of upper cover 101. Electric power transmission coil 23 is formed by winding a coil wire around an axis of winding O2 which extends in the vertical direction. A hollow portion is provided m a central portion of electric power transmission coil 23. Though a helical flat coil Is adopted in the example shown in FIG. 5, coils in various shapes can be adopted for electric power transmission coil 23.

Ferrite plate 110 is formed in a rectangular shape and includes a coil carrying surface 153 and a rear surface 152. Electric power transmission coil 23 is arranged on coil carrying surface 153. An upper surface of ferrite plate 110 is defined as coil carrying surface 153 and a lower surface of ferrite plate 110 is defined as rear surface 152.

A hollow portion is provided in a central portion of ferrite plate 110. Ferrite plate 110 includes a plurality of corners 159. A discontinuous portion 158 is provided between adjacent corners 159.

Ferrite plate 110 includes four corner ferrite pieces 155, two side ferrite pieces 156, and two side ferrite pieces 157.

Four corner ferrite pieces 155 are arranged in a form of a frame at a distance from each other Each corner ferrite piece 155 defines corner 159.

Corner ferrite piece 155 includes a divided ferrite plate 160 and a divided ferrite plate 161. Each of divided ferrite plates 160 and 161 is formed to extend from the hollow portion in ferrite plate 110 toward corner 159.

Side ferrite piece 156 is arranged between corner ferrite pieces 155 adjacent in a longitudinal direction of ferrite plate 110. Side ferrite piece 156 includes a plurality of divided ferrite plates 162 aligned in the longitudinal direction of ferrite plate 110.

Side ferrite piece 157 is arranged between corner ferrite pieces 155 adjacent in a direction of a short side of ferrite plate 110. Side ferrite piece 157 includes a plurality of divided ferrite plates 163.

Discontinuous portion 158 is provided between side ferrite piece 157 and corner ferrite piece 155 and between side ferrite piece 156 and corner ferrite piece 155.

Metal plate 111 is arranged on a side of rear surface 152 of ferrite plate 110. Metal plate 111 is formed, for example, of a metal such as aluminum or an aluminum alloy. Metal plate 111 is in a form of a plate and includes an upper surface 151 and a lower surface 150.

Cooling apparatus 112 is arranged on lower surface 150 of metal plate 111. Cooling apparatus 112 is substantially in a form of a plate. Cooling apparatus 112 includes an upper surface 136 and a lower surface 137.

Cooling apparatus 112 includes a coolant storage portion 130, a cooling portion 131, a guide plate 332, and a coolant storage portion 133. Cooling apparatus 112 is arranged on lower surface 150 of metal plate 111.

Cooling portion 131 is in a form of a hollow plate. A supply port 138 is provided in one side surface of cooling portion 131 and a discharge port 139 is provided in the other side surface of cooling portion 131.

Coolant storage portion 130 is connected to supply port 138 of cooling portion 131. Coolant storage portion 133 is connected to discharge port 139 in the other side surface located opposite to coolant storage portion 130.

Guide plate 132 is arranged in cooling portion 131. Guide plate 132 is formed to extend from supply port 138 toward discharge port 139.

A supply pipe 134 is connected to coolant storage portion 130 and a coolant B is supplied from supply pipe 134 to coolant storage portion 130. Coolant B supplied to coolant storage portion 130 is supplied into cooling portion 131. Coolant B supplied into cooling portion 131 is guided by guide plate 132 from supply port 138 toward discharge port 139. Coolant B is supplied from discharge port 139 into coolant storage portion 133 and discharged through a discharge pipe 135. Discharge pipe 135 is connected to a not-shown radiator and coolant B is cooled by the radiator and again supplied to supply pipe 134. Coolant B is forced to circulate by a pump.

Substrate 113 is arranged on a side of lower surface 137 of cooling apparatus 112. Substrate 113 is in a form of a plate and includes an upper surface 125 and a lower surface 124.

Filter 24 includes a capacitor 126 and a coil 127 representing the device. Coil 127 is arranged on upper surface 125 of substrate 113. Capacitor 126 is arranged on lower surface 124 of substrate 113.

Cooling apparatus 112 is thus arranged between ferrite plate 110 and coil 127 representing the device. Cooling apparatus 112 feeds coolant B to pass between coil 127 and ferrite plate 110.

A flow of a magnetic flux and a state of a temperature of each of coil units 3 and 4 at the time when electric power is contactlessly transmitted from coil unit 3 on the electric power transmission side configured as above to coil unit 4 on the electric power reception side will now be described.

Figure 7:
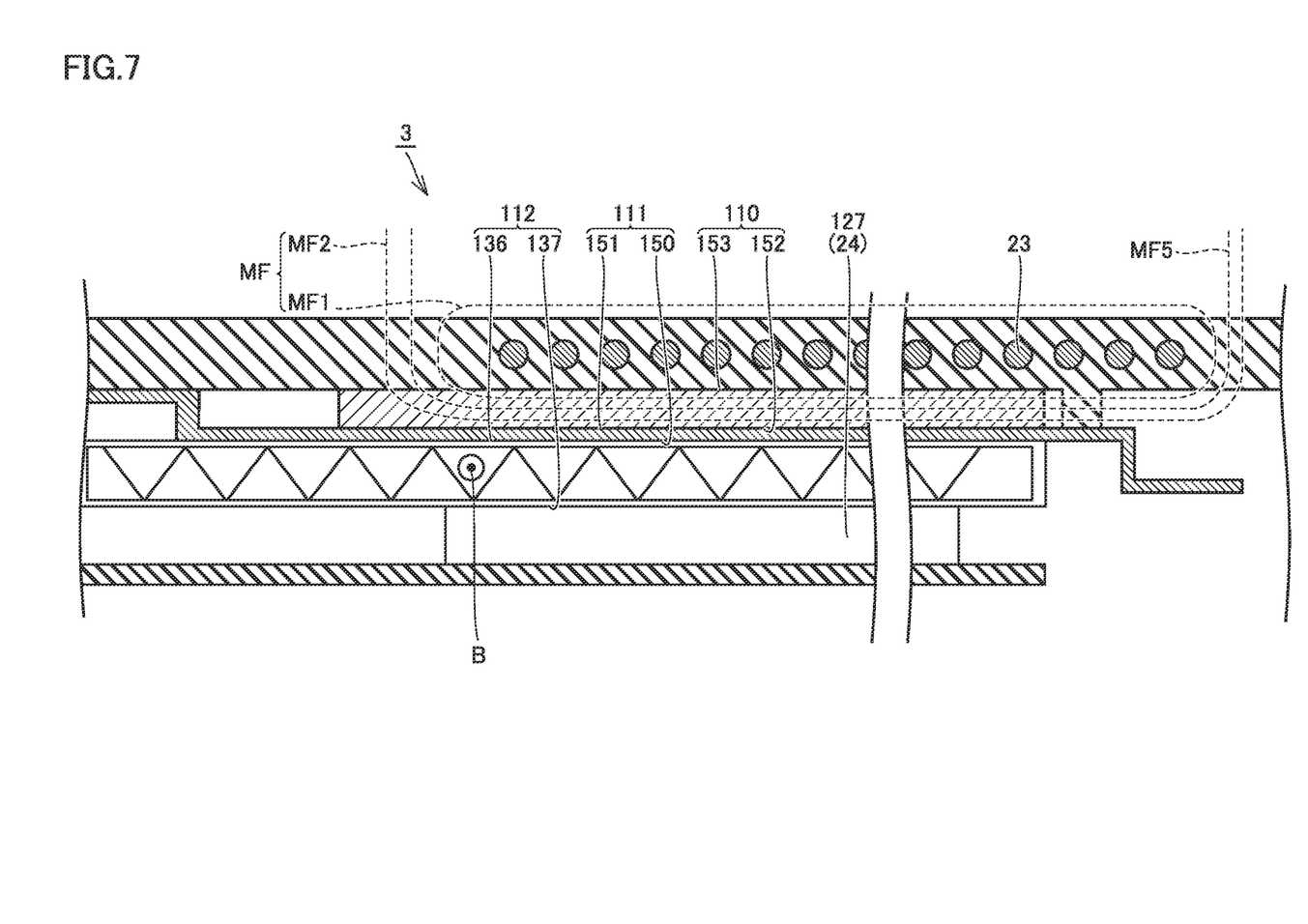
FIG. 7 is a cross-sectional view showing a part of coil unit 3 in electric power transmission.
Figure 8:
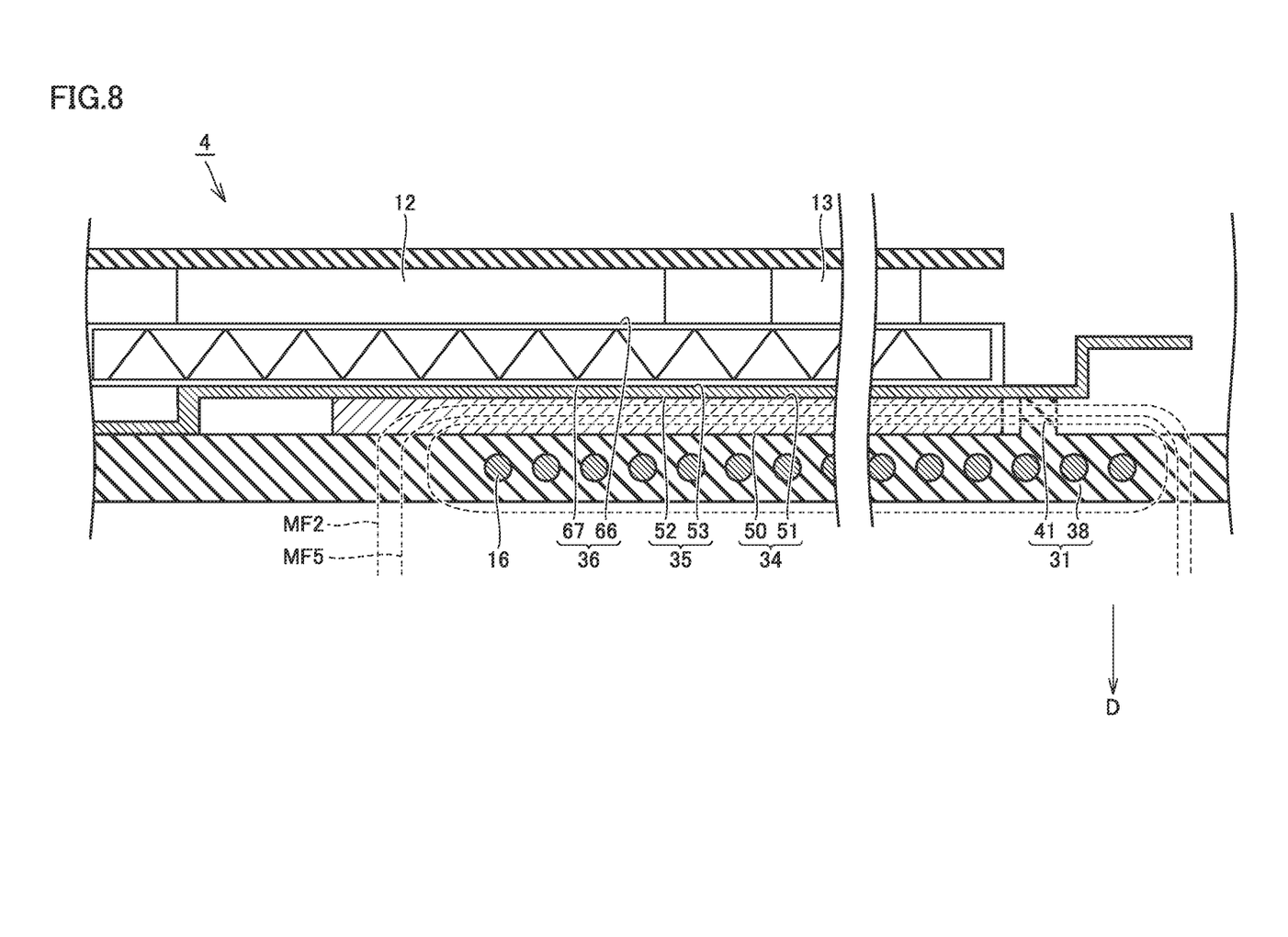
FIG. 8 is a cross-sectional view showing a part of coil unit 4 in electric power reception.

FIG. 7 is a cross-sectional view showing a part of coil unit 3 in electric power transmission and FIG. 8 is a cross-sectional view showing apart of coil unit 4 in electric power reception.

When an AC current flows to electric power transmission coil 23, a magnetic flux is formed around electric power transmission coil 23. A magnetic flux MF formed around electric power transmission coil 23 passes through the hollow portion in electric power transmission coil 23, fertile plate 110, and an outer peripheral side of electric power transmission coil 23.

Ferrite plate 110 is higher in relative permeability than air or aluminum. Therefore, for example, most of magnetic fluxes which pass through the hollow portion of electric power transmission coil 23 from above electric power transmission coil 23 passes through ferrite plate 110. Passage of magnetic flux MF toward metal plate 111 or cooling apparatus 112 is suppressed.

Magnetic flux MF includes a magnetic flux MF1 and a magnetic flux MF2. Magnetic flux MF1 is formed to pass through ferrite plate 110 and to surround electric power transmission coil 23.

Magnetic flux MF2 is formed to pass through ferrite plate 110 and pass from a side of an outer peripheral edge portion of electric power transmission coil 23 and an inner peripheral edge portion of electric power transmission coil 23 toward coil unit 4.

In FIG. 8, when linkage of some of magnetic fluxes MF2 with electric power reception coil 16 occurs, an AC current flows in electric power reception coil 16. When the AC current flows in electric power reception coil 16, a magnetic flux MF5 is formed also around electric power reception coil 16.

Magnetic flux MF5 and magnetic flux MF2 which undergoes linkage with electric power reception coil 16 flow in ferrite plate 34. Linkage of some of magnetic fluxes MF5 with electric power transmission coil 23 then occurs.

With linkage of the magnetic flux with both of electric power transmission coil 23 and electric power reception coil 16, electric power reception coil 16 receives electric power from electric power transmission coil 23 in a contactless manner.

A state of a temperature in coil unit 3 and coil unit 4 will now be described. When an AC current flows in electric power transmission coil 23 in FIG. 7, electric power transmission coil 23 generates heat owing to a resistance of electric power transmission coil 23.

When magnetic flux MF flows in ferrite plate 110, ferrite plate 110 generates heat owing to magnetic reluctance of ferrite plate 110. As a temperature of ferrite plate 110 is higher, magnetic reluctance of ferrite plate 110 is higher. As magnetic reluctance of ferrite plate 110 is higher, a temperature of ferrite plate 110 increases.

During electric power transmission, an AC current also flows in coil 127 of filter 24. When an AC current flows in coil 127, a temperature of coil 127 is higher. In particular, when coil 127 is wound around a ferrite core, a magnetic flux flows in the ferrite core and a temperature of the ferrite core increases.

In coil unit 3 according to the present embodiment, cooling apparatus 112 is arranged between ferrite plats 110 and coil 127 of filter 24. Cooling apparatus 112 supplies coolant B between ferrite plate 110 and coil 127 of filter 24.

Cooling apparatus 112 can simultaneously cool coil 127 and ferrite plate 110. Therefore, coil unit 3 can be more compact than in an example in which a cooling apparatus which cools coil 127 representing the device and a cooling apparatus which cools ferrite plate 110 are separately provided.

When ferrite plate 110 is cooled, electric power transmission coil 23 is also cooled through ferrite plate 110.

According to coil unit 3 in the present embodiment by thus, arranging cooling apparatus 112 between ferrite plate 110 and coil 127 representing the device, the inside of coil unit 3 can efficiently be cooled and increase in volume of coil unit 3 can be suppressed.

When an AC current flows in electric power reception coil 16 in FIG. 8, electric power reception coil 16 generates heat owing to a resistance of electric power reception coil 16.

When magnetic flux MF flows in ferrite plate 34, ferrite plate 34 generates heat owing to magnetic reluctance of ferrite plate 34. As a temperature of ferrite plate 34 is higher, magnetic reluctance of ferrite plate 34 is higher. When magnetic reluctance of ferrite plate 34 is higher, a temperature of ferrite plate 34 increases.

During electric power reception, a current flows also in electric power conversion devices 12 and 13. When the current flows in electric power conversion devices 12 and 13, electric power conversion devices 12 and 13 generate heat.

In coil unit 4 according to the present embodiment, cooling apparatus 36 is arranged between ferrite plate 34 and electric power conversion, devices 12 and 13. Cooling apparatus 36 supplies coolant A between ferrite plate 34 and electric power conversion devices 12 and 13.

Cooling apparatus 36 can simultaneously cool ferrite plate 34 and electric power conversion devices 12 and 13.

Therefore, coil unit 4 can be more compact than in an example in which a cooling apparatus which cools electric power conversion devices 12 and 13 representing the device and a cooling apparatus which cools ferrite plate 34 are separately provided.

When ferrite plate 34 is cooled, electric power reception coil 16 is also cooled through ferrite plate 34.

According to coil unit 4 in the present embodiment, by thus arranging cooling apparatus 36 between ferrite plate 34 and electric power conversion devices 12 and 13 representing the device, the inside of coil unit 4 can efficiently be cooled and increase in volume of coil unit 4 can be suppressed.

As shown in FIG. 3, in coil unit 4, electric power reception coil 16, ferrite plate 34, cooling apparatus 36, and electric power conversion devices 12 and 13 are stacked in the vertical direction. Various devices are not provided laterally to electric power reception coil 16 and ferrite plate 34.

Figure 9:
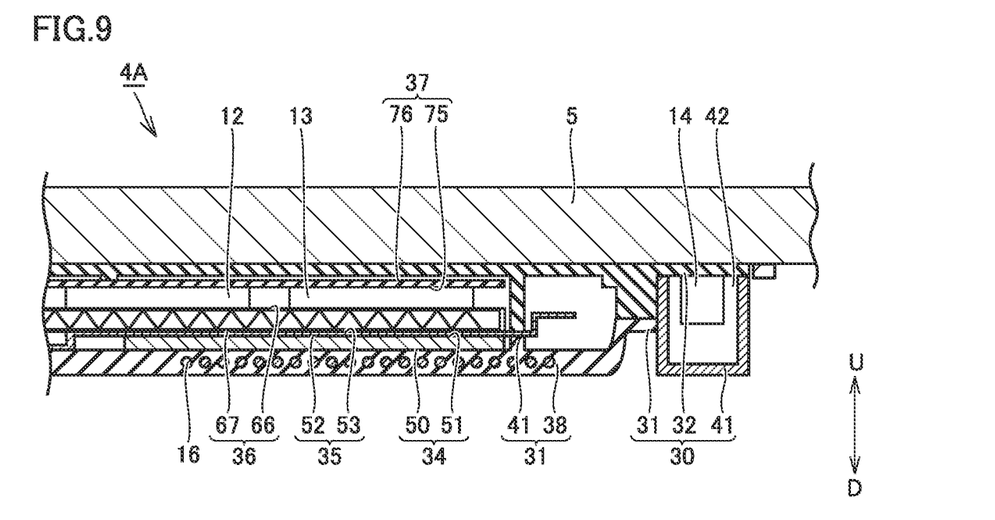
FIG. 9 is a cross-sectional view showing another example of coil unit 4.

FIG. 9 is a cross-sectional view showing another example of coil unit 4. Case 30 for a coil unit 4A includes lower cover 31, upper cover 32, and a metal cover 41.

Metal cover 41 is provided adjacently to lower cover 31. Metal cover 41 and upper cover 32 define an accommodation space 42. Filter 14 is accommodated in accommodation space 42.

Metal cover 41 is formed of aluminum or an aluminum alloy. Therefore, entry of a magnetic flux into filter 14 during electric power reception can be suppressed.

In coil unit 4A configured as above, a magnetic flux formed around electric power reception coil 16 may enter metal cover 41 during electric power reception.

When the magnetic flux enters metal cover 41, an eddy current flows over a surface of metal cover 41. The eddy current generates electromagnetic field. This electromagnetic field is distributed such that a magnetic flux which enters metal cover 41 is less. This electromagnetic field prevents a magnetic flux from traveling toward electric power reception coil 16 and there is less linkage of a magnetic flux with electric power reception coil 16.

Consequently, coil unit 4A may be lower in efficiency in electric power reception than coil unit 4 shown in FIG. 4. In other words, coil unit 4 tends to achieve high efficiency in electric power reception.

In coil unit 4A as well, cooling, apparatus 36 is arranged between electric power conversion devices 12 and 13 and ferrite plate 34, and electric power conversion devices 12 and 13, ferrite plate 34, and electric power reception coil 16 can efficiently be cooled.

Coil unit 4A can be smaller in thickness in the vertical direction than cod unit 4.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A coil unit comprising:
   a ferrite plate including a coil carrying surface and a rear surface opposite to the coil carrying surface;
   a coil arranged on a side of the coil carrying surface of the ferrite plate;
   a device arranged on a side of the rear surface of the ferrite plate; and
   a cooling apparatus which feeds a coolant between the ferrite plate and the device.

2. The coil unit according to claim 1, the coil unit being mounted on a vehicle including a power storage device, wherein
   the device includes a first electric power conversion apparatus and a second electric power conversion apparatus which convert alternating-current power received by the coil into direct-current power and supply the direct-current power to the power storage device, and
   the first electric power conversion apparatus and the second electric power conversion apparatus are connected in parallel to each other between the coil and the power storage device.

\* \* \* \* \*

UNITED STATES PATENT AND TRADEMARK OFFICE
CERTIFICATE OF CORRECTION

PATENT NO.       : 10,658,100 B2
APPLICATION NO.  : 16/013366
DATED            : May 19, 2020
INVENTOR(S)      : Hiroaki Yuasa It is certified that error appears in the above-identified patent and that said Letters Patent is hereby corrected as shown below:

In the Specification

In Column 1, Line(s) 57, after "suppressed", delete ",".

In Column 3, Line(s) 23, delete "power-storage" and insert --power storage--, therefor.

In Column 3, Line(s) 64, after "supplied", delete ",".

In Column 4, Line(s) 3, after "includes", delete ":".

In Column 4, Line(s) 4, delete "device 30" and insert --device 10--, therefor.

In Column 5, Line(s) 18, delete "to ward" and insert --toward--, therefor.

In Column 5, Line(s) 19, after "discharge", delete "part" and insert --port--, therefor.

In Column 5, Line(s) 59, after "resin", delete ",".

In Column 6, Line(s) 5, after "provided", delete "m" and insert --in--, therefor.

In Column 6, Line(s) 23, after "other", insert --,--.

In Column 8, Line(s) 31, after "embodiment", insert --,--.

In Column 8, Line(s) 53, after "conversion", delete ",".

In Column 9, Line(s) 35, after "cooling", delete ",".

In Column 10, Line(s) 5, delete "cod" and insert --coil--, therefor.

Signed and Sealed this
Twenty-eighth Day of July, 2020

Andrei Iancu
*Director of the United States Patent and Trademark Office*